United States Patent
Brown

Patent Number: 5,431,143
Date of Patent: Jul. 11, 1995

[54] RETURN FUEL ACCUMULATING MODULE

[75] Inventor: Bradley A. Brown, Leonard, Mich.

[73] Assignee: Ford Motor Company, Dearborn, Mich.

[21] Appl. No.: 266,056

[22] Filed: Jun. 27, 1994

[51] Int. Cl.6 .......................................... F02M 37/04
[52] U.S. Cl. ................................. 123/514; 123/509; 137/576; 137/434
[58] Field of Search ............... 123/514, 509, 516, 506, 123/510, 456; 137/571, 572, 574, 576, 577, 578, 434

[56] References Cited

U.S. PATENT DOCUMENTS

| | | |
|---|---|---|
| 3,785,750 | 1/1974 | Bryant . |
| 4,279,232 | 7/1981 | Schuster et al. . |
| 4,385,615 | 5/1983 | Keane ................... 123/514 |
| 4,503,885 | 3/1985 | Hall ...................... 137/574 |
| 4,694,857 | 9/1987 | Harris . |
| 4,706,707 | 11/1987 | Betterton ............. 137/434 |
| 4,747,388 | 5/1988 | Tuckey . |
| 4,869,225 | 9/1989 | Nagata et al. . |
| 4,971,017 | 11/1990 | Beakley ............... 123/509 |
| 4,974,570 | 12/1990 | Swargulski et al. . |
| 5,018,502 | 5/1991 | Humpl ................. 123/514 |
| 5,044,344 | 9/1991 | Tuckey et al. . |
| 5,050,567 | 9/1991 | Suzuki ................. 123/514 |
| 5,070,849 | 12/1991 | Rich et al. . |
| 5,195,494 | 3/1993 | Tuckey . |
| 5,197,444 | 3/1993 | Lang ..................... 123/514 |
| 5,197,445 | 3/1993 | Casari . |
| 5,218,942 | 6/1993 | Coha et al. . |
| 5,237,977 | 8/1993 | Tuckey . |
| 5,253,628 | 10/1993 | Brown .................. 137/576 |
| 5,303,685 | 4/1994 | Forgacs ............... 123/514 |

Primary Examiner—Carl S. Miller
Attorney, Agent, or Firm—David B. Kelley; Roger L. May

[57] ABSTRACT

A fuel delivery system has a fuel pump which draws fuel from a fuel tank to supply pressurized fuel to the fuel metering system of an internal combustion engine, and a conduit connecting the pump intake with an enclosed, pressurizable fuel reservoir for accumulating return fuel therein so as to provide a ready source of liquid fuel to the pump during conditions which cause insufficient fuel availability at the pump intake, such as low fuel tank level, sudden cornering, or grade parking. Pressurized return fuel fills the reservoir until a predetermined overflow pressure is reached and an overflow valve opens to allows fuel overage to flow into the fuel tank. When the fuel level in the tank drops below a predetermined level, the fuel level sender arm attached to the reservoir depresses a plunger to shut the overflow valve. Pressure within the reservoir then builds until exceeding the setpoint release pressure of a supply valve located between the pump intake and the reservoir, at which time the supply valve opens to allow liquid fuel to flow from the reservoir to the pump. The setpoint release pressure of the supply valve exceeds that of the predetermined overflow pressure of the overflow valve.

17 Claims, 4 Drawing Sheets

RETURN FUEL ACCUMULATING MODULE

FIELD OF THE INVENTION

The present invention relates to fuel delivery systems, and, more particularly, to a system for accumulating fuel returned from an automotive fuel metering device to provide a source of low vapor content, liquid fuel to the fuel pump in the event of interruption of fuel flow from the fuel tank.

BACKGROUND OF THE INVENTION

Automotive fuel system designers have long recognized the need for ensuring a continuous flow of fuel to the vehicle's fuel metering system during vehicle operation. This is commonly accomplished by positioning the fuel pump intake at a low point in the fuel tank so as to be covered while fuel remains in the tank. When the fuel level in the tank is low, however, the intake may become uncovered due to fuel "slosh" within the tank. The "slosh" phenomenon occurs during sudden or sharp vehicle cornering when fuel "sloshes" to and fro within the tank, or during driving on steep grades or parking on an incline, when fuel collects in a location away from the pump intake. Should the intake become uncovered, the pump will draw fuel vapor and air causing temporary interruption of fuel flow.

One approach to curtailing the "slosh" problem is to locate the pump intake, perhaps along with the pump itself, within a fuel accumulating reservoir in the fuel tank so that even when fuel level in the tank is low, a source of fuel is available to the fuel pump. During vehicle operation, the reservoir is filled with fuel, either by routing a portion of pressurized fuel to a jet pump to entrain fuel from the tank to the reservoir, as disclosed in U.S. Pat. No. 4,869,225 (Nagata et al.), or by routing return fuel to the fuel reservoir, as in U.S. Pat. No. 4,694,857 (Harris), or a combination of these, as disclosed in U.S. Pat. No. 5,070,849 (Rich, et al.) and U.S. Pat. No. 5,218,942 (Coha et al.), or other methods known to those skilled in the art and suggested by this disclosure.

A drawback of prior reservoir-based fuel delivery systems is time-induced efficiency decrease of the reservoir filling mechanism. For example, as the fuel pump ages, its efficiency typically decreases causing a decrease in delivery volume. If a portion of the fuel pump output is used as input to drive a jet pump for filling the reservoir, the jet pump delivery volume to the reservoir will also decrease. Since the fuel pump draws fuel directly from the reservoir, fuel pump demand may exceed jet pump output, resulting in the very problem sought to be solved in the first place, that is, insufficient fuel at the pump intake.

The just described problem may be exacerbated when pressurized, heated fuel from the fuel metering assembly is returned to the fuel reservoir whereupon it vaporizes causing a foam build-up therein. If drawn into the fuel pump, the foam may cause vapor lock and other concomitant problems.

An object of the present invention is to provide a fuel delivery system which ensures that sufficient liquid fuel is available at the fuel pump intake during low fuel level operation.

Another object is to provide a fuel delivery system which prevents vaporization of fuel returned to the fuel reservoir.

An advantage of the present invention is that the fuel pump draws fuel directly from the fuel tank, not the reservoir, until fuel within the tank falls below a predetermined level.

Another advantage is that a separate jet pump or similar device is not required to fill the reservoir.

Yet another advantage of the present invention is an enclosed fuel reservoir which accumulates fuel in a pressurized state so as to prevent vaporization and thus provide a source of liquid fuel to the fuel pump inlet when fuel in the tank falls below a predetermined level.

A feature of the present invention is an enclosed, pressurizable fuel reservoir which accumulates heated, pressurized fuel returned from the fuel metering system and retains the fuel in a liquid state by pressurizing same so as to prevent vaporization of the returned fuel.

Another feature is a reservoir overflow valve which allows fuel flow from the reservoir to the fuel tank when the reservoir is filled, the overflow valve being shut by a fuel level sender operatively associated therewith when fuel within the tank drops below a predetermined level so that pressure may build within the reservoir and open a valve leading to a conduit in fluid communication with the fuel pump inlet.

SUMMARY OF THE INVENTION

This invention is a new and improved fuel delivery system comprising a fuel pump having a pump inlet in fluid communication with a fuel tank and a pump outlet in fluid communication with a fuel metering system of an internal combustion engine, and a fuel reservoir having a reservoir inlet in fluid communication with a pressurized fuel source and a reservoir outlet in fluid communication with the pump inlet. Supply valve means, preferably comprising a spring-loaded one-way valve, is positioned between the reservoir outlet and the pump inlet to prevent fuel flow from the reservoir to the pump until pressure in the reservoir reaches a predetermined release pressure. Overflow valve means between the reservoir and the fuel tank allows fuel to flow from the reservoir to the fuel tank when pressure within the reservoir reaches a predetermined overflow pressure. Preferably, the overflow means comprise a spring-loaded one-way valve. Overflow shut-off means are operatively associated with the overflow valve means for opening and closing the overflow valve means relative to fuel level within the tank.

The supply valve means allows fuel flow from the reservoir, through the reservoir outlet, to a conduit in fluid communication with the pump inlet, the supply valve means preventing flow of fuel from the conduit to the reservoir.

The overflow shut-off means preferably comprises a fuel level sender mounted rotatably mounted on the reservoir so as to contact a plunger which is spring-loaded against the overflow valve such that the sender depresses the plunger to close the overflow valve when fuel within the tank drops below a predetermined level.

The pressurized fuel source can be a return line from the fuel rail.

DETAILED DESCRIPTION OF THE PREFERRED EMBODIMENTS

Figure 1:
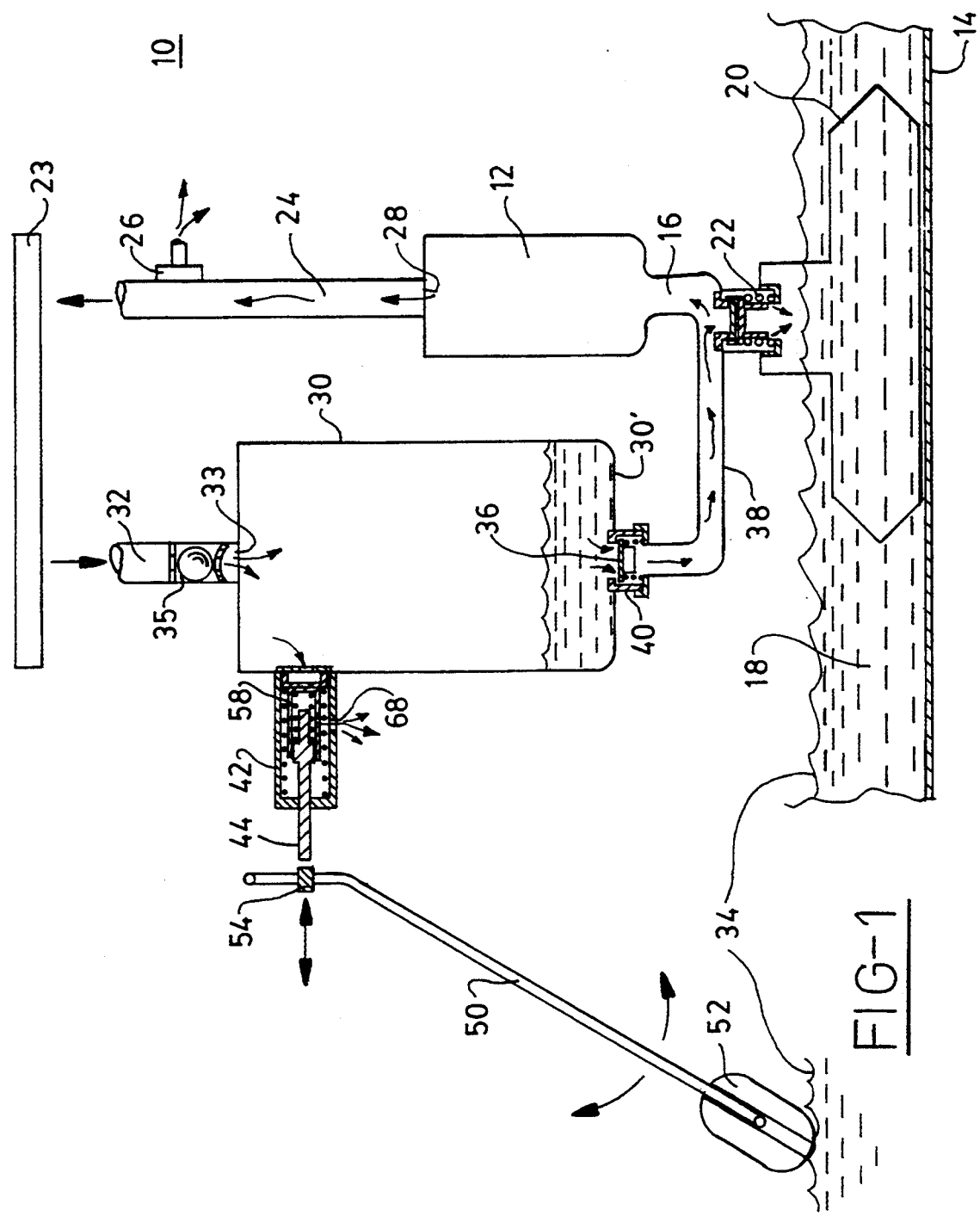
FIG. 1 is schematic view of a fuel delivery system according to the present invention.
Figure 3:
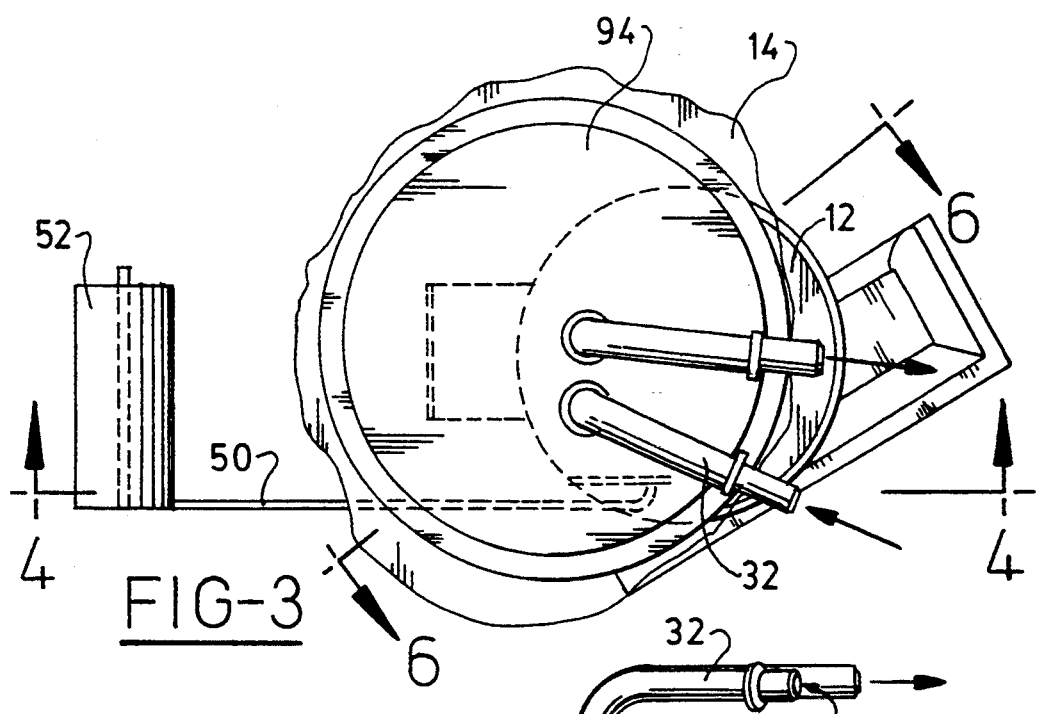
FIG. 3 is a top view of a fuel delivery system according to the present invention.

As shown in FIG. 1, a fuel delivery system 10 has a fuel pump 12, preferably electrically operated, mounted within fuel tank 14. Pump 12 has fuel intake 16 for drawing fuel 18 from tank 14 through fuel filter sock 20. Pump inlet valve 22, preferably a one-way spring-loaded valve, allows fuel flow from tank 14 to pump 12, but not vice-versa. Pressurized fuel is conveyed to the fuel metering system, for example fuel rail 23, of an internal combustion engine (not shown) by fuel supply line 24. To protect against fuel pump 12 overpressurization, fuel pump outlet valve 26 is located downstream of pump outlet 28 and preferably is set to open between approximately 55 psi and 75 psi.

Still referring to FIG. 1, an enclosed, pressurizable fuel reservoir 30 accumulates heated, pressurized fuel returned from the fuel rail 23 through return line 32 and reservoir inlet 33. A one-way valve 35 prevents fuel flow from reservoir 30 to return line 32. The returned fuel remains in a liquid state since confining same within reservoir 30 prevents vaporization as pressure builds therein. Fuel accumulated in reservoir 30 is routed to fuel pump intake 16, as further described below, should fuel level 34 in fuel tank 14 fall below a predetermined level.

Figure 4:
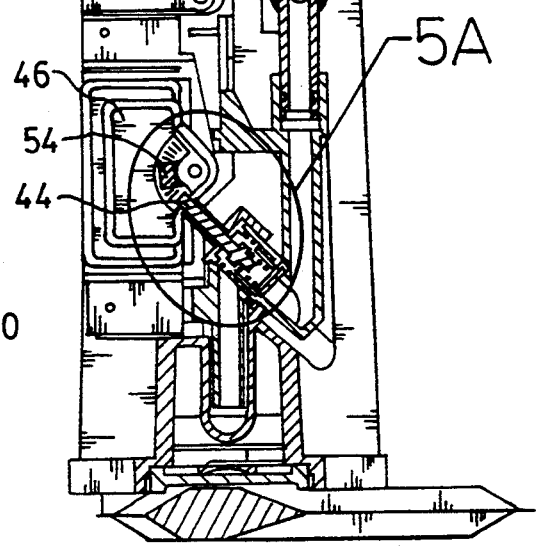
FIG. 4 is a cut-away view along line 4—4 of FIG. 3 showing a reservoir overflow valve mounted on a fuel reservoir according to the present invention.

Reservoir 30 has a reservoir outlet 36 situated at lower portion thereof, preferably in bottom 30', in fluid communication with conduit 38 which leads to pump intake 16 (FIG. 1). Positioned between reservoir outlet 36 and conduit 38 is supply valve 40 which retains fuel within reservoir 30 until pressure therein exceeds a predetermined release pressure, as further described below with particular reference to FIGS. 6, 7A and 7B. Also located on reservoir 30 is overflow valve 42, as seen in FIGS. 1 and 2, for allowing fuel overage to flow from reservoir 30 to fuel tank 14 when pressure within reservoir 30 reaches a predetermined overflow pressure less than the predetermined release pressure, as is discussed in greater detail below with reference to FIGS. 4, 5A and 5B.

Figure 2:
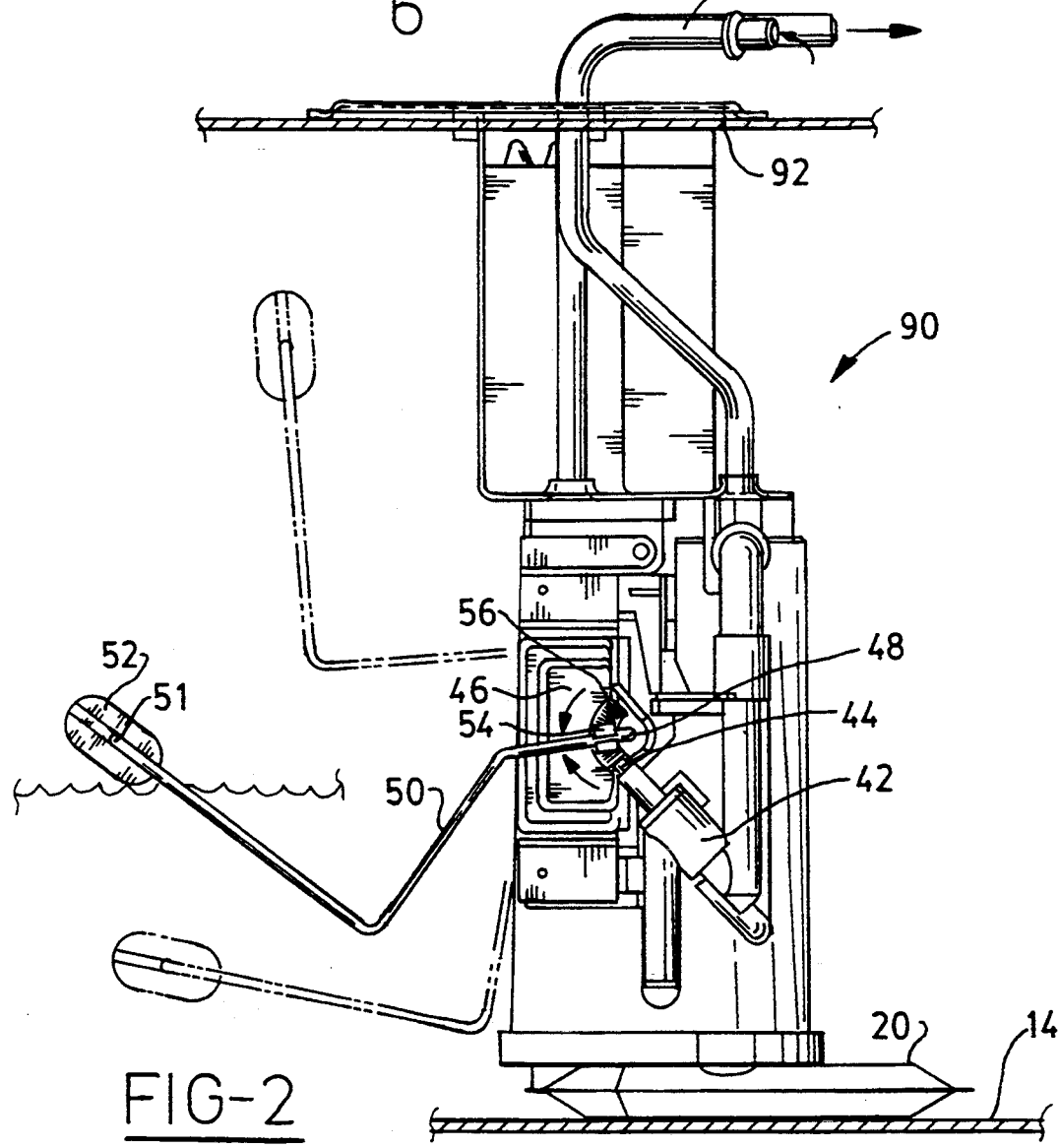
FIG. 2 is a side view of a fuel delivery system according to the present invention shown mounted in a fuel tank.

Operatively associated with overflow valve 42 is an overflow shut-off mechanism, preferably comprising plunger 44 and fuel level sender 46, which selectively closes overflow valve 42 relative to fuel level 34 within fuel tank 14 (FIG. 2). Plunger 44 operates in conjunction with fuel level sender 46 to perform the overflow shut-off function. Fuel sender 46 is mounted on reservoir 30 and operates in conventional fashion as will be apparent to those skilled in the art. Briefly stated, a first end 48 of float arm 50 is rotatably mounted to reservoir 30, while the other end 51 has float 52 fixed thereto for floatation with fuel level 34. Contact 54 on end 48 travels over track 56 to vary the electrical potential therethrough in a known manner.

In the present invention, however, as seen in FIG. 2, overflow valve 42 is mounted in close proximity to a lower end of track 56 so that contact 54 may depress plunger 44 when fuel level 34, and thus float arm 52, is below a predetermined level. When depressed, plunger 44 shuts overflow valve 42 against the force of a biasing spring 58 (FIGS. 1 and 5B).

In operation, fuel pump 12 draws fuel from tank 14 through fuel filter sock 20, inlet valve 22, and through intake 16 (FIG. 1). Pressurized fuel is conveyed to fuel rail 23 of an internal combustion engine (not shown) by fuel supply line 24, and unburned fuel is returned through return line 32 to reservoir 30 within fuel tank 14. As will be appreciated by those skilled in the art, the returned fuel is hot and normally vaporizes when encountering the lower pressure and cooler conditions in fuel tanks or fuel delivery modules of prior fuel delivery systems. However, since such vaporization is undesirable, as previously discussed above, returned fuel pressure in the present invention is maintained above the fuel vaporization point by completely enclosing reservoir 30, except for return line 32, reservoir outlet 36, and overflow valve 42, which function to control fuel pressure.

Figure 5A:
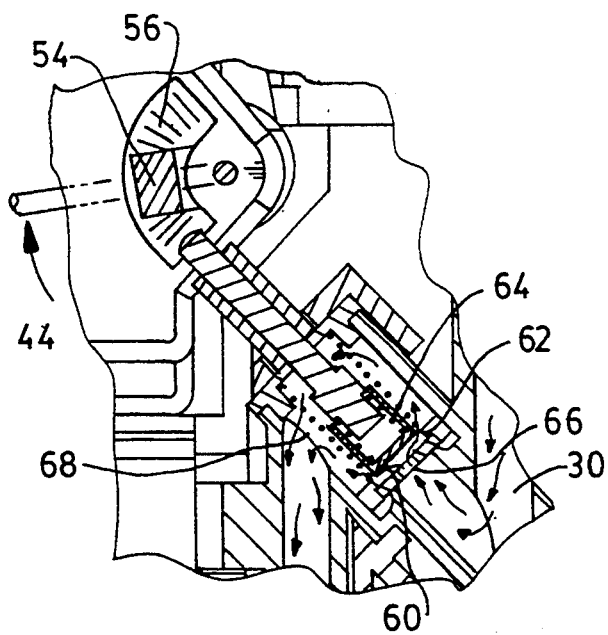
FIG. 5A is a detailed cross-sectional view of the reservoir overflow valve of section 5A of FIG. 4 showing the overflow valve in the open position with the valve plunger undepressed and arrows depicting fuel flow through the valve.
Figure 5B:
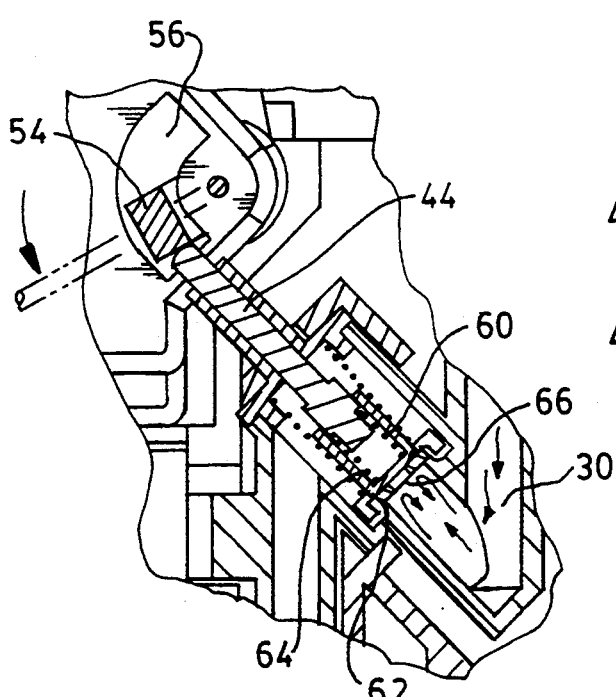
FIG. 5B is a detailed cross-sectional view of the reservoir overflow valve similar to FIG. 5A but showing the overflow valve in the closed position with the valve plunger depressed and arrows depicting fuel flow prevented from passing through the valve.
Figure 7A:
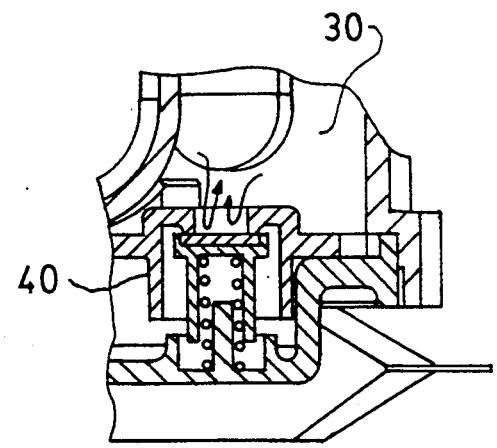
FIG. 7A is a detailed cross-sectional view of the reservoir supply valve of section 7A of FIG. 6 showing the supply valve in the closed position when fuel pressure in the reservoir is below a predetermined release pressure and arrows depicting fuel flow prevented from passing through the valve.

When fuel level in tank 14 is above a predetermined level so that contact 56 does not depresses plunger 44, overflow valve 42 and supply valve 40 are closed, as shown in FIGS. 5B and 7A, respectively, until reservoir 30 pressure exceeds predetermined levels. As fuel enters reservoir 30, pressure begins to build therein until exceeding a predetermined overflow pressure, approximately 0.5 psi to 6 psi. The predetermined overflow pressure setpoint will vary according to application with vehicles operating on higher fuel temperatures requiring higher reservoir 30 pressures to prevent fuel vaporization.

If reservoir 30 is not initially full, some fuel may vaporize and remain in reservoir 30 until vented through overflow valve 42. When the pressure within reservoir 30 exceeds the overflow pressure, valve element 60 is forced from valve seat 62 against spring 64 of overflow valve 42 which forces plunger 44 toward the lower end of track 56 (FIG. 5A). Fuel vapor and fuel overage can then pass through opening 66, to overflow outlet 68 and into tank 14. Returned fuel typically continues to enter reservoir 30 as long as the vehicle operates, and fuel vaporization is curtailed since pressurized liquid fuel fills reservoir 30. Fuel overage will continue to flow through overflow valve 42 until the pressure in reservoir 30 falls below the overflow pressure, or until fuel level 34 falls below a predetermined level, such as when fuel is low or when cornering or grade parking as described above.

When fuel level 34 falls below a predetermined level, float 52 drops by gravity to that same level thus rotating contact 54 on end 48 of float arm 50 to a lower end of track 56 to depress plunger 44 (FIG. 5B). The force of contact 54 on plunger 44 pushes valve element 60 onto seat 62 thus obstructing opening 66 and preventing fuel from overflowing to tank 14. With overflow valve 42 overridden shut and return fuel continuing to enter from return line 32, reservoir 30 pressure quickly rises with supply valve 40 in the closed position (FIG. 7A).

Figure 7B:
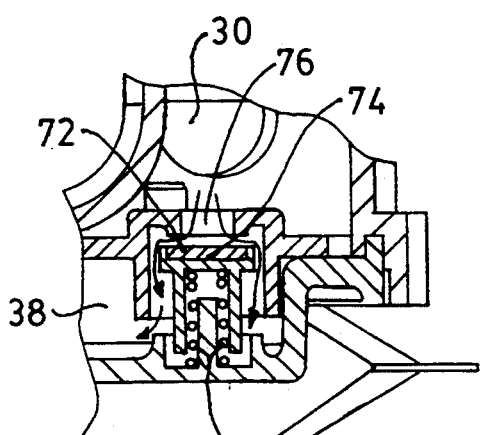
FIG. 7B is a detailed cross-sectional view of the reservoir supply valve similar to FIG. 7A but showing the supply valve in the open position when fuel pressure in the reservoir is below a predetermined release pressure and with arrows depicting fuel flow through the valve.
Figure 6:
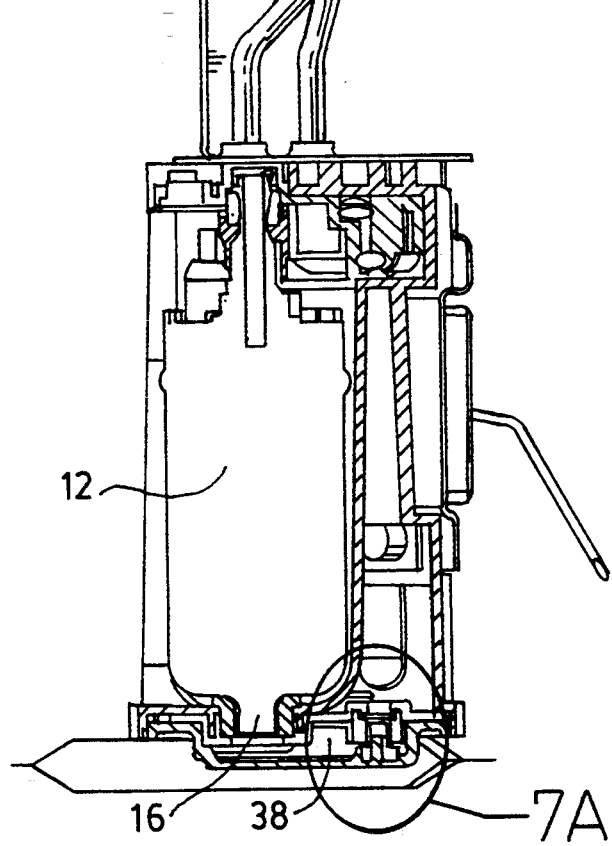
FIG. 6 is a cut-away view along line 6—6 of FIG. 3 showing a reservoir supply valve mounted on a bottom portion of the fuel reservoir.

When reservoir 30 pressure exceeds the release pressure of supply valve 40, which is approximately between 1.5 psi and 7 psi, fuel pressure overcomes the biasing force of spring 70 against valve element 72 and so lift it from valve seat 74 (FIG. 7B). Fuel can thus flow from reservoir 30, through opening 76, into conduit 38, and to intake 16 of pump 12 (FIGS. 6 and 7B). As such, pump 12 will have a ready supply of liquid fuel even when tank 14 level is low, during sudden cornering, or incline parking. It is important to recognize that the predetermined overflow pressure setpoint of overflow valve 42 must be less than the predetermined release pressure setpoint of supply valve 40 so that fuel will accumulate in reservoir 30 before being supplied to pump intake 16 through conduit 38.

As with the predetermined overflow setpoint, the predetermined release pressure of supply valve 40 varies with application depending on expected fuel temperature within the system. Preferably, the overflow pressure setpoint of overflow valve 42 is between approximately 1 psi to 2 psi less than the predetermined release pressure setpoint of supply valve 40.

As best seen in FIG. 2, fuel pump 12 and reservoir 30 are preferably joined together, along with fuel sender 46, fuel supply line 24, return line 32, and filter 20 into a single unit, more commonly known to those skilled in the art as a fuel delivery module 90. The module 90 is then mounted into a top portion of tank 14 through opening 92 and fixed to tank 14 with flange 92. Supply line 24 and return line 32 pass through flange 92 for attachment of hoses (not shown) thereto.

It will be apparent to those skilled in the art that a jet pump or other fuel entraining device is not required for operation of this invention. More importantly, fuel pump 12 is not contained within reservoir 30 and is designed to draw relatively cool fuel from tank 14 during normal operation when fuel level 34 is above a predetermined level. The predetermined level at which fuel sender 46 depresses plunger 44 to shut overflow valve 42 will depend on many factors, including the shape of tank 14, the type of vehicle, and other considerations known to those skilled in the art and suggested by this disclosure.

Although the preferred embodiment of the present invention has been disclosed, various changes and modifications may be made without departing from the scope of the invention as set forth in the appended claims.

I claim:
1. A fuel delivery system comprising:
 (1) a fuel pump having a pump inlet in fluid communication with a fuel tank and a pump outlet in fluid communication with a fuel metering system of an internal combustion engine; and
 (2) a fuel reservoir having:
  (a) a reservoir inlet in fluid communication with a pressurized fuel source;
  (b) a reservoir outlet in fluid communication with said pump inlet;
  (c) overflow valve means between said reservoir and said fuel tank for allowing fuel to flow from said reservoir to said fuel tank when accumulated fuel in said reservoir causes pressure therein to exceed a predetermined overflow pressure;
  (d) overflow shut-off means operatively associated with said overflow valve means for selectively closing said overflow valve means in response to the fuel level within said fuel tank to permit pressure within said reservoir to exceed said predetermined overflow pressure; and
  (e) supply valve means between said reservoir outlet and said pump inlet to prevent fuel flow from said reservoir to said pump until pressure in said reservoir reaches a predetermined release pressure greater said predetermined overflow pressure.

2. A fuel delivery system according to claim 1 wherein said overflow valve means comprises a spring-loaded, one-way valve allowing fuel flow from said reservoir to said tank when pressure within said reservoir reaches a predetermined overflow pressure.

3. A fuel delivery system according to claim 2 wherein said overflow shut-off means comprises a fuel level sender mounted on said reservoir so as to contact a plunger which is spring-loaded against said overflow valve such that said sender depresses said plunger to close said overflow valve when fuel within said tank drops below a predetermined level.

4. A fuel delivery system according to claim 3 wherein said fuel level sender is rotatably mounted on said reservoir.

5. A fuel delivery system according to claim 1 wherein said supply valve means comprises a spring-loaded, one-way valve for pressurizing said reservoir to a predetermined pressure between approximately 1.5 psi and 7 psi, whereupon said supply valve opens allowing fuel flow from said reservoir, through said reservoir outlet, to a conduit in fluid communication with said pump inlet, said one-way valve preventing flow of fuel from said conduit to said reservoir.

6. A fuel delivery system according to claim 1 wherein said pressurized fuel source is a return line from said fuel rail.

7. A fuel delivery system according to claim 1 wherein a one-way valve is located between said reservoir inlet and said fuel source to prevent fuel from flowing thereto from said reservoir.

8. An automotive fuel delivery system comprising:
 (1) a fuel pump having a pump inlet in fluid communication with a fuel tank and a pump outlet in fluid communication with a fuel rail for an internal combustion engine; and
 (2) a pressurizable fuel reservoir having:
  (a) a reservoir inlet in fluid communication with a return line from the fuel rail;
  (b) a reservoir outlet in fluid communication with the pump inlet;
  (c) an overflow valve between the reservoir and the fuel tank for allowing fuel to flow from the reservoir to the fuel tank when accumulated fuel in the reservoir causes pressure therein to exceed a predetermined overflow pressure;

(d) an overflow shut-off mechanism operatively associated with the overflow valve for selectively closing the overflow valve in response to the fuel level within the fuel tank to permit pressure within the reservoir to exceed the predetermined overflow pressure; and (e) a supply valve between the reservoir outlet and the pump inlet to prevent fuel flow from the reservoir to the pump until pressure in the reservoir reaches a predetermined release pressure greater the predetermined overflow pressure.

9. A fuel delivery system according to claim 8 wherein the overflow valve comprises a spring-loaded, one-way valve allowing fuel flow from the reservoir to the tank when pressure within the reservoir reaches a predetermined overflow pressure.

10. A fuel delivery system according to claim 9 wherein the overflow shut-off mechanism comprises a fuel level sender mounted on the reservoir so as to contact a plunger which is spring-loaded against the overflow valve such that the sender depresses the plunger to close the overflow valve when fuel within the tank drops below a predetermined level.

11. A fuel delivery system according to claim 10 wherein the fuel level sender is rotatably mounted on the reservoir.

12. A fuel delivery system according to claim 8 wherein the supply valve comprises a spring-loaded, one-way valve for pressurizing the reservoir to a predetermined pressure between approximately 1.5 psi and 7 psi, whereupon the supply valve opens allowing fuel flow from the reservoir, through the reservoir outlet, to a conduit in fluid communication with the pump inlet, said one-way valve preventing flow of fuel from the conduit to the reservoir.

13. A fuel delivery system according to claim 8 wherein the fuel pump and the reservoir are combined into a fuel delivery module and mounted within the fuel tank.

14. A fuel delivery system according to claim 8 wherein the pressurized fuel source is a return line from the fuel rail.

15. A fuel delivery system according to claim 8 wherein a one-way valve is located between the reservoir inlet and the fuel source to prevent fuel from flowing from the reservoir to the fuel source.

16. An automotive fuel delivery system comprising:
(1) a fuel pump having a pump inlet in fluid communication with a fuel tank and a pump outlet in fluid communication with a fuel rail of an internal combustion engine; and
(2) a pressurizable fuel reservoir having:
  (a) a reservoir inlet in fluid communication with a return line from the fuel rail;
  (b) a reservoir outlet in fluid communication with the pump inlet;
  (c) an overflow valve between the reservoir and the fuel tank for allowing fuel to flow from the reservoir to the fuel tank when accumulated fuel in the reservoir causes pressure therein to exceed a predetermined overflow pressure;
  (d) an overflow shut-off mechanism operatively associated with the overflow valve for selectively closing the overflow valve in response to the fuel level within the fuel tank to permit pressure within the reservoir to exceed the predetermined overflow pressure; and
  (e) a supply valve between the reservoir outlet and the pump inlet to prevent fuel flow from the reservoir to the pump until pressure in the reservoir reaches a predetermined release pressure, between approximately 1 psi to 2 psi greater than the predetermined overflow pressure, whereupon the supply valve opens allowing fuel flow from the reservoir, through the reservoir outlet, to a conduit in fluid communication with the pump inlet, said supply valve preventing flow of fuel from the conduit to the reservoir.

17. A fuel delivery system according to claim 16 wherein the fuel pump and the reservoir are combined into a fuel delivery module and mounted within the fuel tank.

* * * * *